Figure 1:
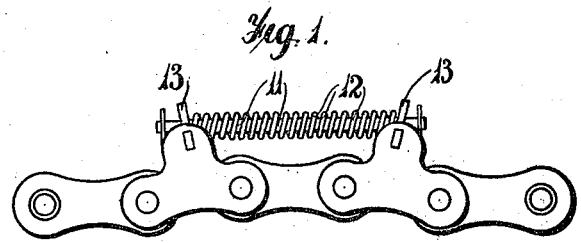

G. WADHAMS & A. T. BEST.
DRIVING CHAIN.
APPLICATION FILED JUNE 18, 1917.

1,275,329.

Patented Aug. 13, 1918.

Inventors:-
George Wadhams and
Arthur Thomas Best,
By B. Singer, Atty.

UNITED STATES PATENT OFFICE.

GEORGE WADHAMS AND ARTHUR THOMAS BEST, OF BIRMINGHAM, ENGLAND.

DRIVING-CHAIN.

1,275,329.      Specification of Letters Patent.      Patented Aug. 13, 1918.

Application filed June 18, 1917. Serial No. 175,468.

*To all whom it may concern:*

Be it known that we, GEORGE WADHAMS and ARTHUR THOMAS BEST, subjects of the King of Great Britain, residing at Oliver Street Works, Birmingham, in the county of Warwick, England, have invented a new and useful Driving-Chain; and we do hereby declare the following to be a full, clear, and exact description of the same.

Our invention comprises improvements in driving chains.

In the prior specification of U. S. Patent No. 1183718 in Figures 1-4 a construction of spring driving chain is shown, and the primary object of the present invention is to improve the construction and working of the chain there shown.

In the said prior specification the extremities of the springs bear against abutment plates which move angularly relatively to the guide rod which carries the spring, and in the chains made according to this construction slight wear has been found to take place between the guide rods and the plates.

The object of the present invention is to obviate this defect and in accordance therewith the plates are pressed out so as to provide a bearing of greater length than the thickness of the plate, while the openings in the plates are of greater diameter in the direction of the angular movement between guide pin and plates than in the direction at right angles thereto, thus permitting free angular movement but restraining the parts against lateral movement or shake.

Referring to the drawings:—

Fig. 1. is a side elevation showing a link of the chain according to this invention.

Figure 2:
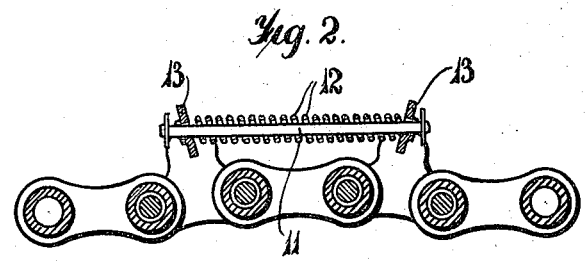

Fig. 2. is a longitudinal section through same with the links in their normal non-tensioned condition.

Figure 3:
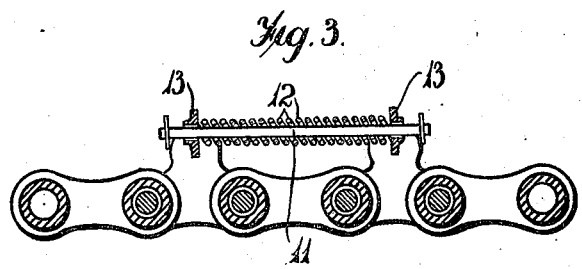

Fig. 3. is a similar view to Fig. 2 but showing the links in the position which they assume under tension.

Figure 4:
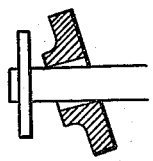
Figure 5:
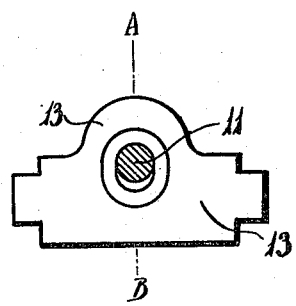

Fig. 4. is an enlarged sectional view through the hole in one of the plates as at A—B in Fig. 5.

Fig. 5. is an enlarged end view of one of the plates.

In carrying our invention into practice as illustrated upon the accompanying drawings, the chain is constructed and operates in manner described in the prior specification, but the openings in the plates 13 which receive the guide pin 11 carrying the spring 12 are pressed out forming a flange around the hole and thus provide a bearing for the guide pin of considerably greater length than the thickness of the plate with consequent decreased liability to wear at this point.

When the hole in the plate is pierced or made of a round shape in order to allow for the relative angular movement between the pin and plate it is necessary to provide an amount of clearance in this hole which not only permits the angular movement but when of a round shape permits a lateral movement between pin and plate, which is also a source of increased wear at this point.

According to the second feature of this invention the hole is made of elongated form having a lateral diameter equal to that of the pin, but a diameter in the direction of the angular movement greater than the diameter of the pin so as to permit the angular movement without lateral movement.

What we claim then is:—

1. A driving chain comprising a plurality of links, including alternate pairs of inner and outer plates, an abutment plate provided with an elongated opening, carried by each pair of outer plates, a guide rod for each pair of abutment plates and a spring carried by each said rod, the ends of such rod being mounted in the openings formed in the abutment plates, in such a manner as to permit angular movement between the said guide rod and abutment plates but preventing lateral movement.

2. A driving chain comprising a plurality of links, including alternate pairs of inner and outer plates, an abutment plate, formed with an opening and being further provided with a flange around said opening, and carried by each pair of outer plates, a guide rod for each pair of abutment plates and a spring carried by each said rod, the ends of said rod passing through the openings formed in the abutment plates, the flanges formed around said openings of a pair of abutment plates providing extended bearings for the guide rod.

In testimony whereof we affix our signatures.

GEORGE WADHAMS.
ARTHUR THOMAS BEST.

Copies of this patent may be obtained for five cents each, by addressing the "Commissioner of Patents, Washington, D. C."